(12) United States Patent
Mitamura

(10) Patent No.: US 6,582,212 B1
(45) Date of Patent: Jun. 24, 2003

(54) TIRE VULCANIZER AND TIRE VULCANIZING EQUIPMENT EQUIPPED WITH THE TIRE VULCANIZER

(75) Inventor: Hisashi Mitamura, Takasago (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 0 days.

(21) Appl. No.: 09/437,446

(22) Filed: Nov. 10, 1999

(30) Foreign Application Priority Data

Nov. 25, 1998 (JP) .......................................... 10-334479
Nov. 25, 1998 (JP) .......................................... 10-334480
Nov. 25, 1998 (JP) .......................................... 10-334510

(51) Int. Cl.[7] .............................................. B29C 35/02
(52) U.S. Cl. ....................................... 425/34.1; 425/38
(58) Field of Search ............................ 425/28.1, 34.1, 425/38, 195

(56) References Cited

U.S. PATENT DOCUMENTS

| 4,088,524 | A | * | 5/1978 | Taylor et al. | .................. | 425/38 |
| 5,165,939 | A | * | 11/1992 | Pizzorno | ...................... | 425/38 |
| 5,206,031 | A | * | 4/1993 | Siegenthaler | .................. | 425/38 |
| 5,244,611 | A | * | 9/1993 | Cristofano et al. | ............ | 425/38 |
| 5,631,028 | A | * | 5/1997 | Mizokawa et al. | ............ | 425/38 |
| 5,681,594 | A | * | 10/1997 | Irie | .............................. | 425/38 |
| 5,723,154 | A | * | 3/1998 | Irie et al. | .................... | 425/34.1 |
| 5,820,885 | A | * | 10/1998 | Irie | .............................. | 425/38 |

FOREIGN PATENT DOCUMENTS

JP          6-328455          11/1994

* cited by examiner

Primary Examiner—James P. Mackey
(74) Attorney, Agent, or Firm—Oblon, Spivak, McClelland, Maier & Neustadt, P.C.

(57) ABSTRACT

A tire vulcanizer comprising a vulcanizing/molding unit which is provided with a mold removably and which vulcanizes and molds a green tire within the mold into a vulcanized tire, a feed system for feeding the green tire to the vulcanizing/molding unit, and a discharge system for discharging the vulcanized tire from the vulcanizing/molding unit, the feed system and the discharge system being located on a front side of the tire vulcanizer. A vulcanizing line is formed by arranging a plurality of such tire vulcanizers side by side so that the respective one sides lie on the same side. It is possible to complete the mold replacing work in a short time and thereby improve the productivity.

11 Claims, 8 Drawing Sheets

TIRE VULCANIZER AND TIRE VULCANIZING EQUIPMENT EQUIPPED WITH THE TIRE VULCANIZER

BACKGROUND OF THE INVENTION

1. Field of the Invention

The present invention relates to a tire vulcanizer for vulcanizing and molding a green tire and a tire vulcanizing equipment equipped with the tire vulcanizer.

2. Description of the Invention

Tire is produced by molding a green tire into a tire shape and then vulcanizing it in a tire vulcanizer. After completion of the molding and vulcanizing, the vulcanized tire is discharged from the tire vulcanizer, followed by air-cooling in a post-cure inflator if necessary, and thereafter the discharged tire is checked for its molded state and becomes a final product.

A conventional tire vulcanizer shown in FIG. 8 has a vulcanizing/molding unit 51 provided with a mold and also has a feed loader 52 and a discharge loader 53 on front and rear sides, respectively, of the vulcanizing/molding unit 51. A green tire 57 on a front-side table 54 is fed to the vulcanizing/molding unit 51, while by means of the discharge loader 53 a vulcanized tire 58 is taken out from the vulcanizing/molding unit 51 and is discharged to a transfer mechanism 55 located on the rear side. A plurality of such tire vulcanizers are arranged side by side so that their front and rear sides are located on the same sides respectively to form a vulcanizing line 56. A front side of the vulcanizing line 56 is used as a stay area of the green tire 57, while a rear side of the vulcanizing line 56 is used as a conveyance area for conveyance of the vulcanized tire 58 to an inspection process. Thus, the feed of green tire and the discharge of vulcanized tire are both carried out in one direction from the front to the rear side.

However, in the construction wherein the stay area and the conveyance area are established respectively before and behind the vulcanizing line 56, when the replacement of mold is to be performed for each tire vulcanizer 50 in the vulcanizing line 56, it is required, before starting a mold replacing work, to remove devices mounted on the front side (stay area side) and the rear side (conveyance area side) of the vulcanizing/molding unit 51 which is provided with the mold, to ensure a replacement work area. Besides, after the mold replacing work, a work for restoring the devices to their original states is needed.

Such an operation for ensuring the mold replacement work area and the restoring operation both performed heretofore at every mold replacement give rise to the problem that the productivity is deteriorated. This problem is marked particularly when it is necessary to frequently replace automobile tires of various types and different specifications such as different tire widths and groove shapes.

SUMMARY OF THE INVENTION

It is an object of the present invention to provide a tire vulcanizer capable of completing the replacement of mold in a short time and thereby attaining the improvement of productivity, as well as a tire vulcanizing equipment equipped with the said tire vulcanizer.

The tire vulcanizer according to the present invention comprises a vulcanizing/molding unit provided with a mold removably and adapted to vulcanize and mold a green tire in the mold to afford a vulcanized tire, a feed system for feeding a green tire to the vulcanizing/molding unit, and a discharge system for discharging the vulcanized tire from the vulcanizing/molding unit, the feed system and the discharge system being disposed on either a front side or a rear side of the tire vulcanizer.

In this construction, since the feed system and the discharge system are disposed on one side of tire vulcanizer, the other side of the tire vulcanizer can be ensured as a mold replacement work area. Consequently, unlike the prior art, it is no longer required to perform operations for removing one of the feed system and the discharge system to ensure a work area and restoring the removed system to its original state after the end of the mold replacement work, thus permitting the replacement of mold to be completed in a short time. As a result, it is possible to attain the improvement of productivity.

Preferably, a support frame for supporting the vulcanizing/molding unit is provided.

Preferably, the feed system and the conveyance system are arranged vertically in two stages or in parallel with each other when seen in the horizontal direction and at positions not overlapping each other in the transverse direction when seen from above.

Thus, since the feed system and the discharge system are in a completely separated state in both vertical and transverse directions, when the tire vulcanizer is arranged a plural number in parallel or opposed relation, the tire vulcanizers can be easily handled in a unificative manner without arranging them each individually for the feed and discharge systems.

Preferably, the feed system comprises a tire carrying table adapted to carry a green tire which has been fed to a feed start position up to an intermediate feed position while allowing the green tire to rest thereon and a feed loader adapted to feed the green tire which has been carried to the intermediate feed position up to the vulcanizing/molding unit while holding the green tire. The discharge system comprises a discharge loader adapted to discharge the vulcanized tire from the vulcanizing/molding unit up to an intermediate discharge position while holding the tire and a delivery mechanism adapted to deliver the vulcanized tire which has been discharged to the intermediate discharge position up to a post-process conveying position.

In this case, the feed and discharge systems can be made simpler in construction.

The tire vulcanizing equipment according to the present invention comprises a plurality of any of the above tire vulcanizers and is provided with a vulcanizing line constituted by arranging the tire vulcanizers in parallel so that one sides thereof lie on the same side.

In this case, a mold replacement work area can be ensured along the other side of the vulcanizing line, so even when molds are to be replaced for a large number of tire vulcanizers in the vulcanizing line, it is possible to effect the mold replacing work in a continuous manner. Consequently, not only the mold replacement for each tire vulcanizer can be completed in a short time, but also the mold replacement for all the vulcanizers included in the vulcanizing line can be completed in a short time, so that it is possible to further improve the productivity.

The tire vulcanizing equipment according to the present invention comprises tire vulcanizers of any of those described above, a green tire conveying line comprising a green tire rail and a green tire conveying device, the green tire rail being disposed so as to vertically overlap the feed systems of the tire vulcanizers, the green tire conveying device being capable of traveling on the green tire rail and adapted to feed the green tire to each of the feed systems from above, and a rail support member mounted to the support frame of each tire vulcanizer to support the green tire rail.

Also in this case it becomes possible to complete the mold replacement work in a short time and hence possible to improve the productivity.

BRIEF DESCRIPTION OF THE DRAWINGS

FIGS. 6A and 6B each show a positional relation between a feed system and a discharge system in the tire vulcanizing equipment, of which FIG. 6A shows a conventional positional relation and FIG. 6B shows a positional relation in the present invention;

DESCRIPTION OF THE PREFERRED EMBODIMENT

A tire vulcanizing equipment embodying the present invention will be described hereinunder with reference to FIGS. 1 to 7.

Figure 1:
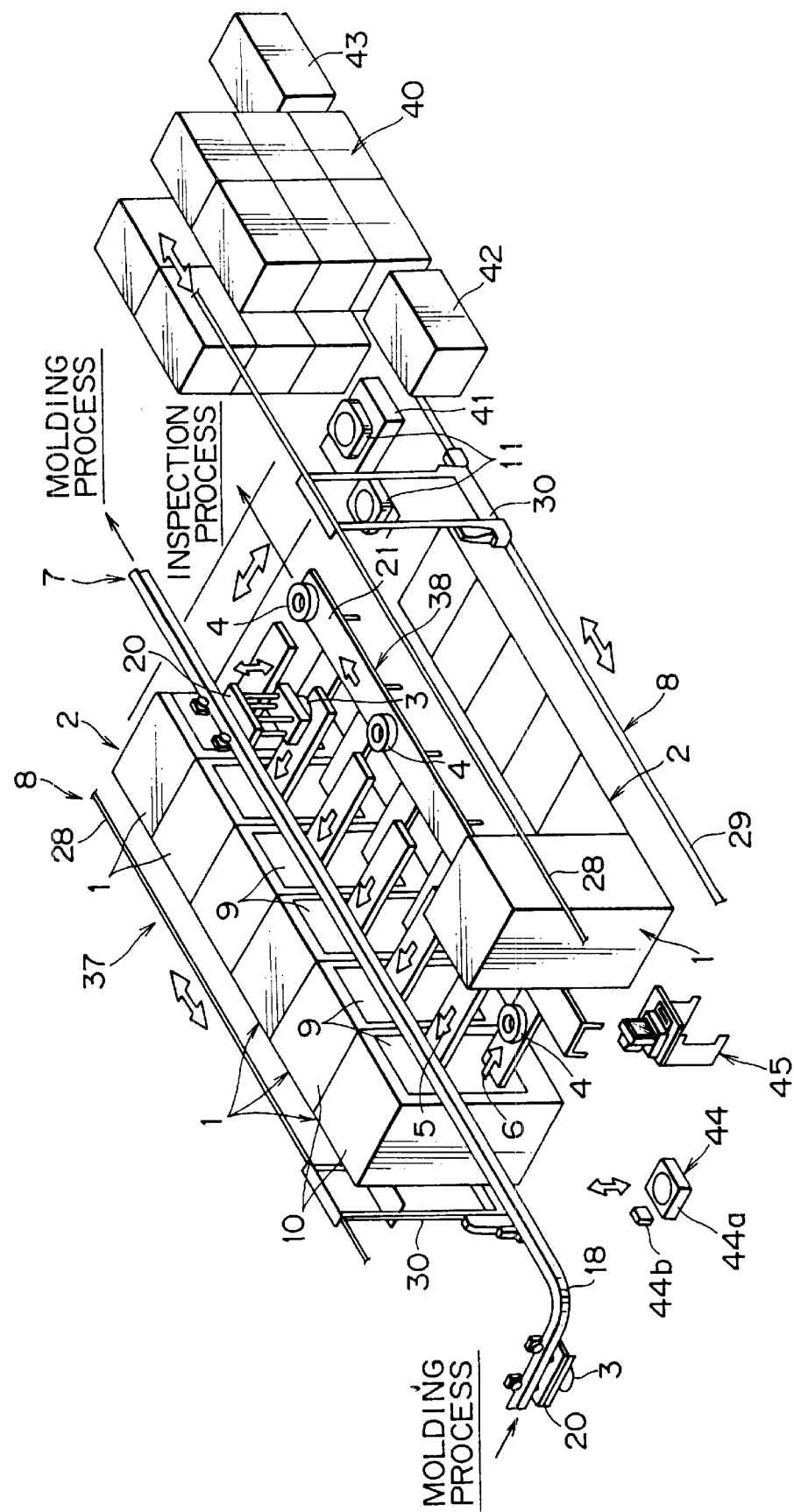
FIG. 1 is a perspective view of a principal portion of a tire vulcanizing equipment according to an embodiment of the present invention.

As shown in FIG. 1, the tire vulcanizing equipment has a plurality of tire vulcanizers 1 for vulcanizing and molding a green tire 3. The vulcanizers 1 are arranged side by side so that their front and rear sides lie on the same sides respectively, to constitute a vulcanizing line 2. The vulcanizers 1 are each provided on the front side (one side) with a feed system 5 for the green tire 3 and a discharge system 6 for a vulcanized tire 4. The feed system 5 and the discharge system 6 are arranged vertically in two stages when seen in the horizontal direction and at positions not overlapping in the transverse direction when seen from above.

On the front side of the vulcanizing line 2 are disposed in a vertically overlapping manner both a green tire conveying line 7 for conveying the green tire before vulcanizing and molding and a vulcanized tire conveying line 38 for conveying the vulcanized tire 4. On the rear side (the other side) of the vulcanizing line 2 is disposed a mold conveying line 8 conveying and replacing a mold 11. The tire vulcanizing equipment has one set of a vulcanizing station 37 which comprises two systems of vulcanizing lines 2. The two systems of vulcanizing lines 2 are disposed symmetrically right and left on both sides of the conveying lines 7 and 38. One system of the green tire conveying line 7 and vulcanized tire conveying line 38 is used in common by both vulcanizing lines 2.

Figure 2:
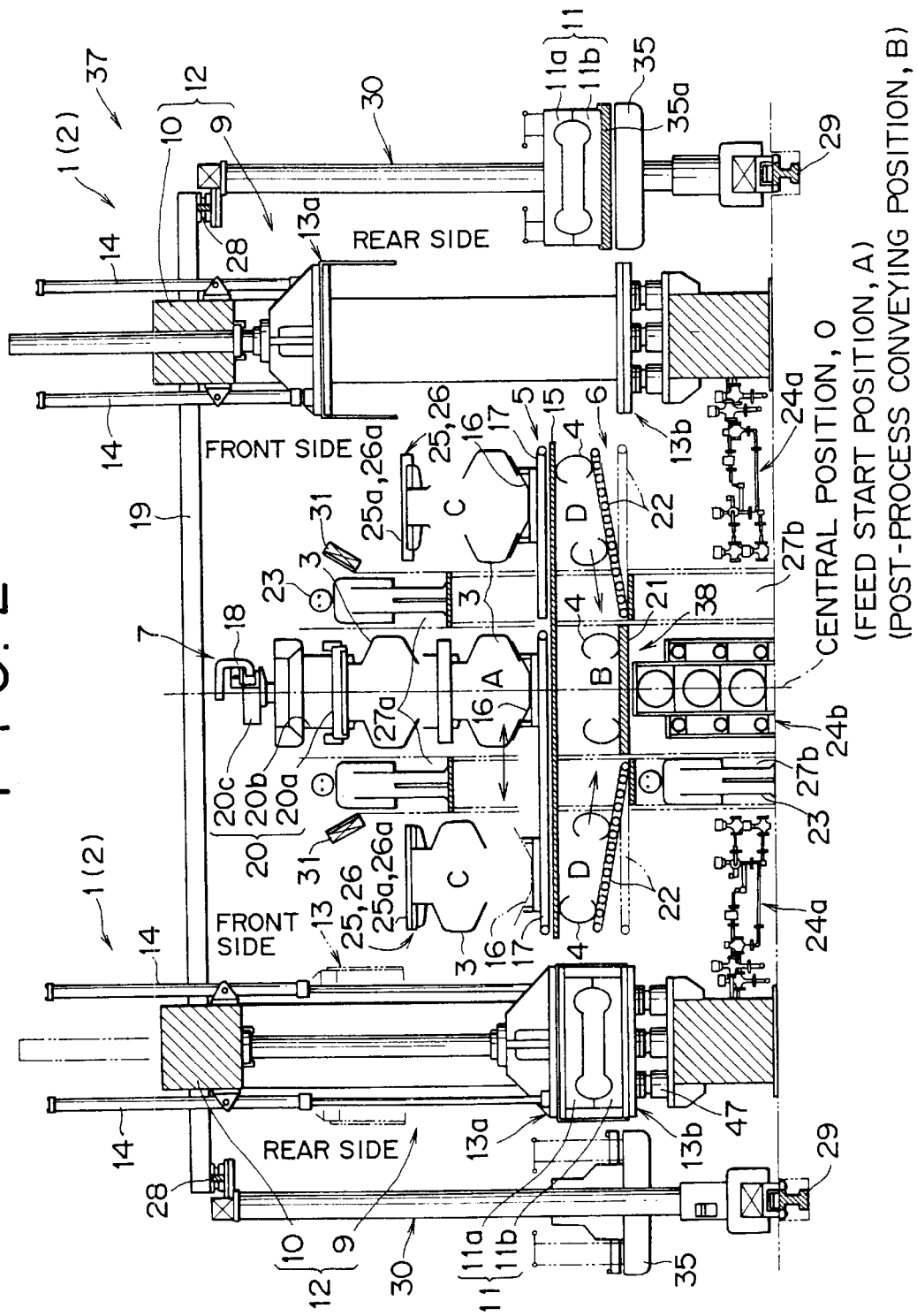
FIG. 2 is an explanatory diagram showing the operation of the tire vulcanizing equipment.
Figure 3:
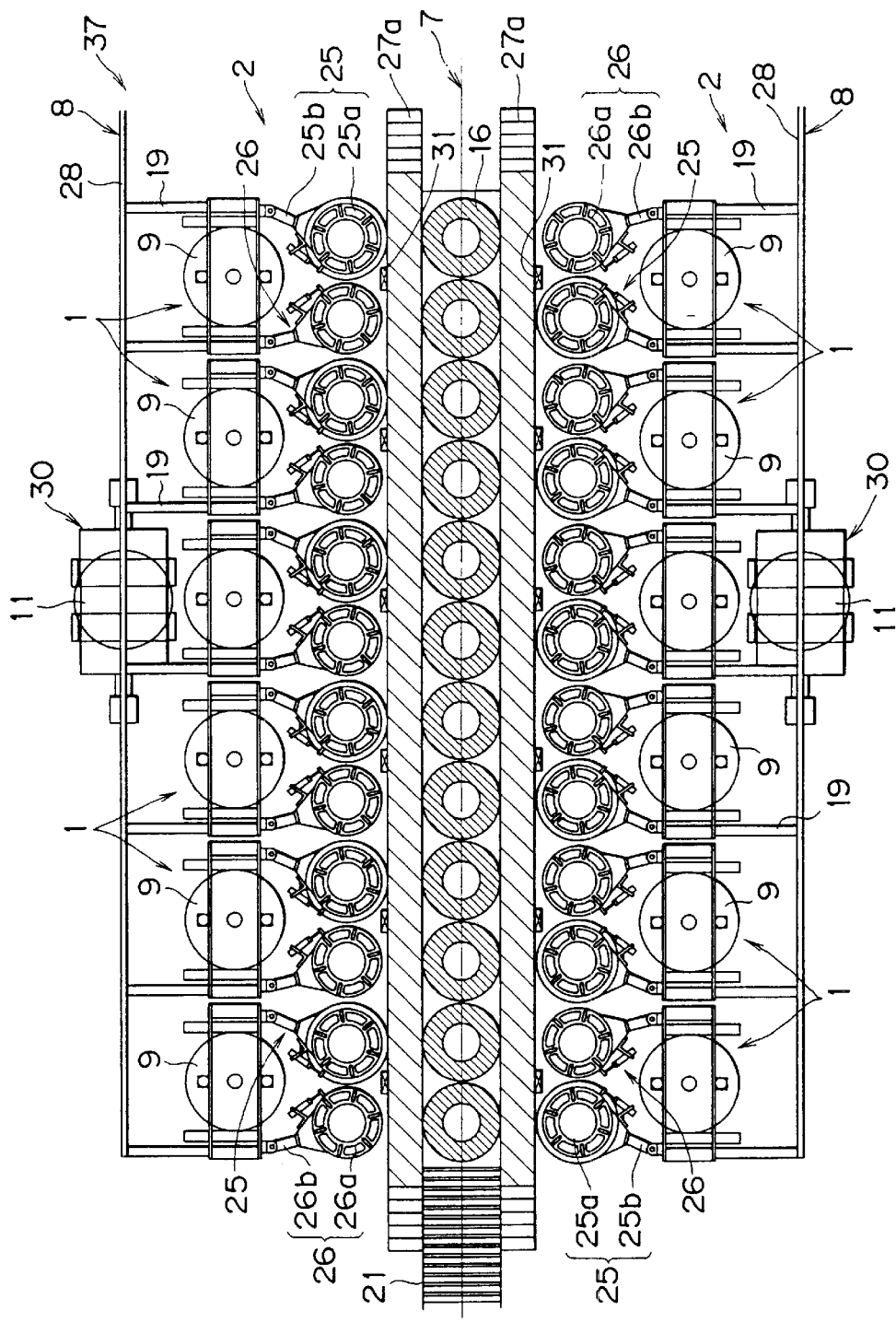
FIG. 3 is a plan view of a principal portion of the tire vulcanizing equipment.

As shown in FIG. 2, the tire vulcanizers 1 which constitute each vulcanizing line 2 each have a vulcanizer body 12, the vulcanizer body 12 comprising a vulcanizing/molding unit 9 to which the green tire 3 is fed and a support frame 10 having a longitudinally open hollow portion into which the vulcanizing/molding unit 9 is disposed. The vulcanizing/molding unit 9 comprises a mold 11 which comprises an upper mold 11a and a lower mold 11b, an upper platen mechanism 13a adapted to heat the upper mold 11a while holding it removably, lift cylinders 14 provided on an upper portion of the support frame 10 and adapted to raise and lower the upper platen mechanism 13a, and a lower platen mechanism 13b adapted to heat the lower mold 11b while holding it removably. In feeding the green tire 3 and discharging the vulcanized tire 4, the vulcanizing/molding unit 9 causes the upper mold 11a to rise through the upper platen mechanism 13a by the lift cylinders 14 to open the mold 11, while at the time of vulcanizing and molding, the vulcanizing/molding unit 9 causes the upper mold 11a to move down and the mold 11 is clamped by mold clamping cylinders 47, followed by heating.

On the front side of the vulcanizer body 12 are disposed the feed system 5 and the discharge system 6 vertically in two stages when seen in the horizontal direction. The feed system 5, which is disposed at the upper stage, comprises a horizontal support base 15 disposed horizontally between opposed vulcanizer bodies 12, a tire carrying table 16 disposed movably on the horizontal support base 15, a table driving mechanism 17 which causes the tire carrying table 16 to reciprocate between a feed start position A (a central position O between the opposed tire vulcanizers 1) and an intermediate feed position C (an end portion of the horizontal support base 15), and a feed loader 25. The feed loader 25 comprises a chuck portion 25a for chucking the green tire 3 and an arm portion 25b shown in FIG. 3 which causes the chuck portion 25a to turn from the intermediate feed position C to the vulcanizing molding unit 9. In the feed system 5 thus constructed, when the green tire 3 is put on the tire carrying table 16 at the feed start position A, the green tire 3 is moved to the intermediate feed position C along the horizontal support base 15, at which position the green tire 3 is chucked by the chuck portion 25a of the feed loader 25 and is fed to the vulcanizing/molding unit 9.

Above the feed start position A on the horizontal support base 15 is disposed the green tire conveying line 7 for feeding the green tire 3 to the feed system 5. The green tire conveying line 7 comprises a traveling rail 18 which is laid so as to cross the feed system 5 and a green tire conveying device 20 which is engaged with the traveling rail 18. The traveling rail 18 is mounted by means of a rail support member 19 which is supported by the support frames 10 of adjacent vulcanizer bodies 12 opposed to each other.

The green tire conveying device 20 comprises a tire chucking mechanism 20a capable of chucking the green tire 3, a lift mechanism 20b which causes the tire chucking mechanism 20a to move up and down, and a traveling mechanism 20c which causes the green tire conveying device 20 to travel along the traveling rail 18. In the green tire conveying line 7, the green tire conveying device 20 travels while chucking the green tire 3 and causing the tire to rise up to its upper-limit position, then stops upon arrival at a position above the feed system 5 located at a desired position, and thereafter the green tire 3 is allowed to move down and rest on the tire carrying table 16 at the feed start position A.

On the other hand, the discharge system 6 located at the lower stage comprises a discharge loader 26 and a delivery conveyor 22. The discharge loader 26 comprises a chuck portion 26a for chucking the vulcanized tire 4 and an arm portion 26b shown in FIG. 3 which causes the chuck portion 26a to turn from the vulcanizing/molding unit 9 up to an intermediate discharge position D of the delivery conveyor 22. The delivery conveyor 22 is disposed between the intermediate discharge position D and a post-process conveying position B (central position) and is pivotable with one end portion thereof on the position B side as fulcrum. When the vulcanized tire 4 is put on the other end portion of the delivery conveyor 22 located on the intermediate discharge position D side, the delivery conveyor turns so as to raise its other end portion, so that the vulcanized tire 4 is moved toward the post-process conveying position B under a gravitational action. A conveyor 21 for conveying the vulcanized tire 4 is disposed at the post-process conveying position B (central position) and along the vulcanizing line 2. The conveyor 21 constitutes a vulcanized tire conveying line 38 which is connected to an inspection process as a post-process.

Above the feed system 5 and below the discharge system 6 are provided an upper working passage 27a and a lower working passage 27b, respectively. The upper working passage 27a is positioned between the loaders 25, 26 and the central position O and obliquely upward of the vulcanizing/molding unit 9 so that feed and discharge conditions of tires 3 and 4 can be seen clearly by an operator 23. The upper working passage 27a is provided with a control panel 31 correspondingly to each tire vulcanizer 1. The control panel 31 comprises an operating panel provided with a monitor unit and switches, whereby the operation of the associated tire vulcanizer 1 can be controlled in an independent manner. On the other hand, the lower working passage 27b formed below the discharge system 6 extend so as to vertically overlap the upper working passage 27a. On both sides of the lower working passage 27b are laid an individual piping system 24a and a main piping system 24b, both being laid for vulcanization by utilizing a space formed below the feed system 5 and discharge system 6. Further, in a space formed on the tire vulcanizer 1 side is disposed, as necessary, a post-cure inflator (not shown) which inflates and cool the vulcanized tire 4. The lower working passage 27b is used for maintenance, etc. of the piping systems 24a, 24b and the post-cure inflator.

The mold conveying line 8 is laid on the rear side of the vulcanizers 1. The mold conveying line 8 comprises an upper rail 28 and a lower rail 29 which are laid along each vulcanizing line 2 shown in FIG. 3, and a wheeled crane unit 30 adapted to travel along both rails 28 and 29. The upper rail 28 is provided at end portions of the rail support members 19 supported by the support frames 10, while the lower rail 29 is laid within a groove formed in the floor surface.

Figure 4:
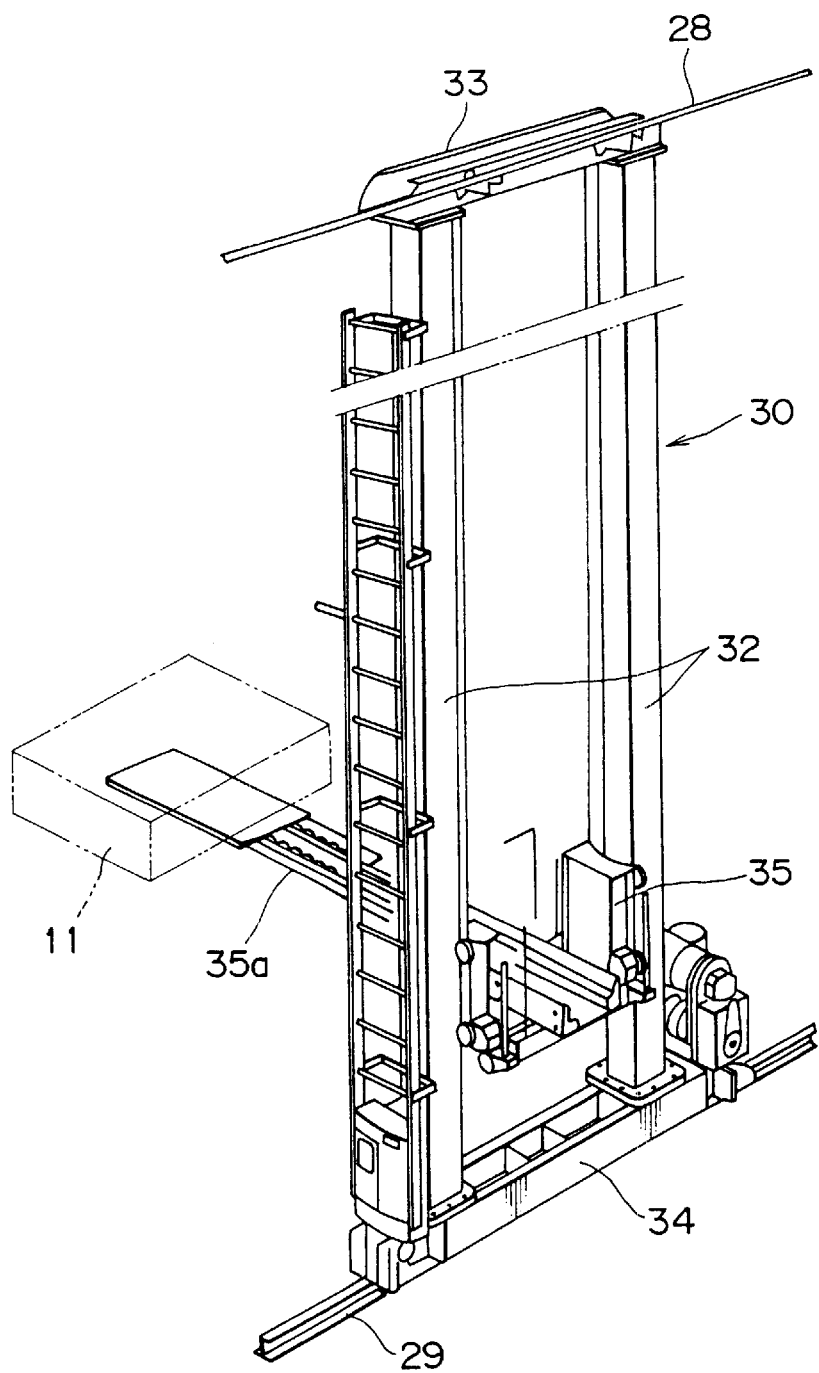
FIG. 4 is a perspective view of a wheeled crane.

As shown in FIG. 4, the wheeled crane unit 30 comprises two intermediate posts 32 erected between both rails 28 and 29, an upper frame 33 which connects upper ends of the intermediate posts 32 with each other and which is engaged with the upper rail 28 movably, a lower frame 34 engaged with the lower frame 29 movably, and a carriage 35 mounted between the intermediate posts 32 vertically movably. The carriage 35 has a fork 35a, the fork 35a supporting the mold 11 and causing the mold to move horizontally, whereby the mold is fed or discharged to or from the vulcanizing/molding unit 9 in each vulcanizer 1.

Figure 5:
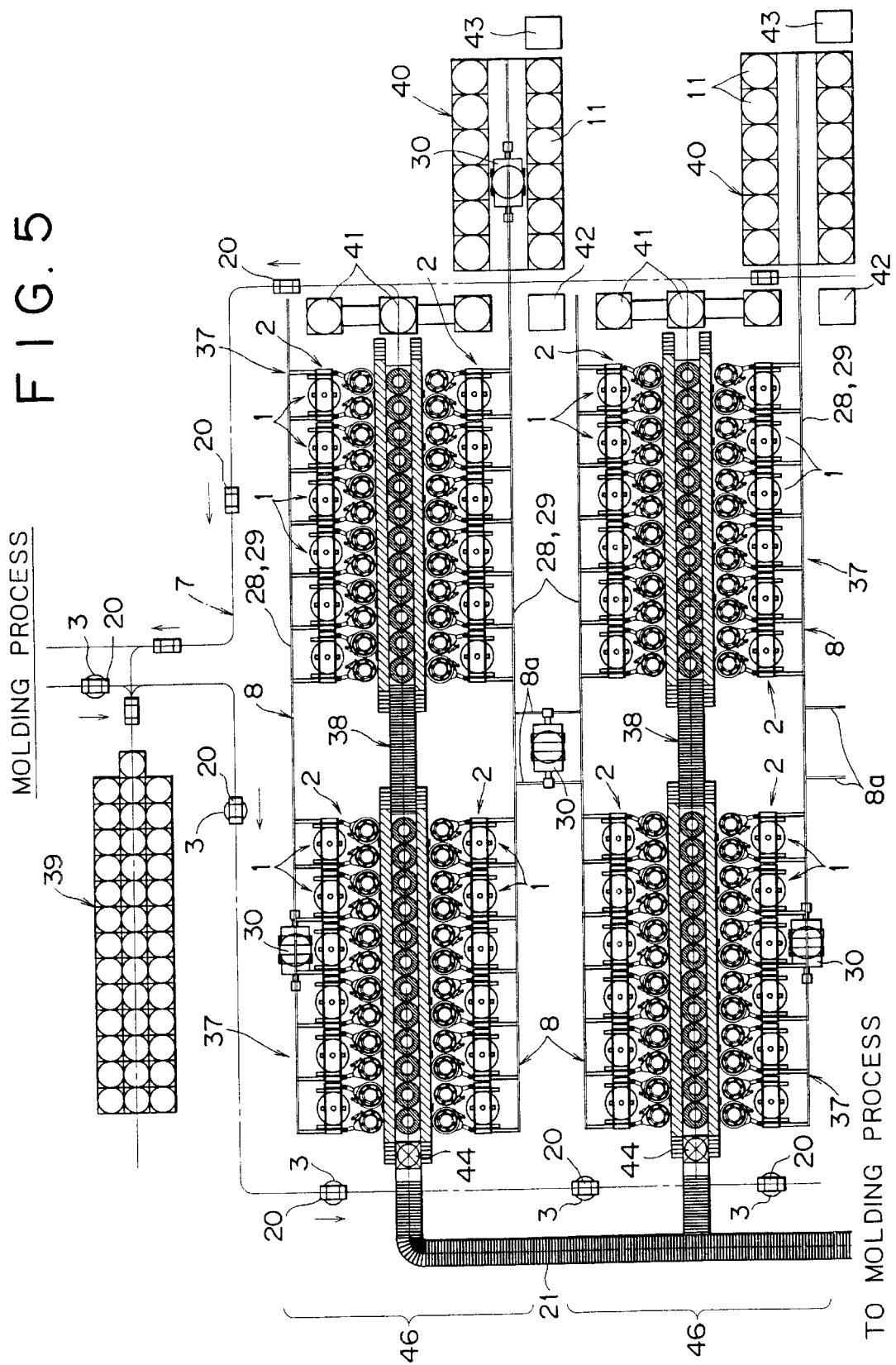
FIG. 5 is a plan view of the tire vulcanizing equipment.

As shown in FIG. 5, the vulcanizing station 37 equipped with the two systems of vulcanizing lines 2 of the above construction is disposed, for example, in a matrix of two rows by two columns in the installation site of the tire vulcanizing equipment. In the said matrix, the vulcanizing stations 37 arranged in each row direction (longitudinal direction of the vulcanizing lines 2) constitute a station group 46 in which the central position O between opposed vulcanizing lines 2 is aligned with that between the other opposed vulcanizing lines.

The vulcanizing stations 37 are connected to each other through the green tire conveying line 7, mold conveying line 8 and vulcanized tire conveying line 38. The green tire conveying line 7 is constituted by laying the traveling rail 18 so that the rail extends from both ends of each station group 46, then passes the outer periphery of the station group and reaches both a molding process and a green tire stock yard 39. One end (left end in the figure) of each station group 46 is used as an inlet side for the green tire 3, while the opposite end (right end in the figure) thereof is used as an outlet side for the green tire. Such a one-way conveyance prevents collision of the green tire conveying devices 20. On the inlet side of the station group 46 is provided a temporary stay portion 44 at a position under the green tire conveying line 7. As shown in FIG. 1, the temporary stay portion 44 comprises a table 44a which can turn at any angle while carrying the green tire 3 thereon, an ID reader 44b which reads production data such as the type and lot number from an ID member attached to the green tire 3, a temporary stay portion controller which determines an insertion angle of the green tire 3 relative to the mold 11 on the basis of the production data and which causes the table 44a to turn at the said insertion angle to take phase matching of the green tire.

On the other hand, as shown in FIG. 5, the vulcanized tire conveying line 38 is constituted by laying the conveyor 21 so as to extend from both ends of each station group 46 and reach the inspection process as a post-process. The mold conveying line 8 is constituted by rails 28 and 29 which are laid rectilinearly along the vulcanizing lines 2 in each vulcanizing station 37, and one mold conveying line in each station group is thereafter capable of communicating with the interior of a mold storage shed 40. The conveying lines 8 positioned at both ends of the station group 46 are connected with each other through a mold carrier 41, thereby permitting receipt and delivery of the mold 11.

The mold storage shed 40 is provided one for each station group 46. The rails 28 and 29 of the mold conveying line 8 are extended into the mold storage shed 40, and the wheeled crane unit 30 adapted to travel on the rails 28 and 29 can move into the mold storage shed 40, whereby it is also used as a crane unit in the mold storage shed. The mold conveying lines 8 between adjacent station groups 46 are connected with each other through connecting rails 8a. The connecting rails 8a permit the wheeled crane unit 30 to move to both said mold conveying lines 8, whereby a single wheeled crane unit 30 is used in common to both adjacent station groups 46 in the replacement of the mold 11.

The mold carrier 41 capable of carrying the mold 11 thereon is provided between the mold storage shed 40 and the vulcanizing station 37 adjacent thereto. The mold carrier 41 is adapted to reciprocate in a direction perpendicular to the rails 28 and 29 of the mold conveying line 8 and thereby deliver and receive the mold 11 to and from the mold conveying line 8 which is not in communication with the mold storage shed 40. At a moving end on the mold storage shed 40 side is installed a preheating station 42 for heating the mold 11 to a predetermined temperature. Near the mold storage shed 40 is also provided a maintenance station 43 for inspection and repair of the mold 11. In this tire vulcanizing equipment, by means of a centralized monitor unit 45 (see FIG. 1), vulcanizing and molding conditions for each tire vulcanizer 1 are established in accordance with a manufacturing plan and the operation of each tire vulcanizer is monitored and controlled. As the centralized monitor unit there is used a personal or office computer provided with a monitor such as a CRT device, a large capacity storage such as a hard disk or a magneto-optic disk and an input device such as a keyboard or a mouse.

The following description is now provided about the operation of each tire vulcanizer 1 and that of the tire vulcanizing equipment both constructed as above.

When vulcanizing and molding data such as the type and quantity of the green tire 3 to be vulcanized and molded are inputted to the centralized monitor unit 45 by an operator in accordance with a manufacturing plan, the centralized monitor unit 45 calculates the number of tire vulcanizers 1 which permits efficient vulcanizing and molding on the basis of the quantity of green tires 3 and the time required for vulcanizing and molding, and then specifies tire vulcanizers 1 in accordance with the thus-calculated number. In the case where the number of tire vulcanizers is large, the specifying of tire vulcanizers is made in the unit of each vulcanizing station 37 or station group 46. Where vulcanizing/molding data are inputted with respect to plural types of green tires 3, tire vulcanizers 1 are specified for each type of green tire 3.

Thereafter, vulcanizing conditions such as time and temperature suitable for each type of green tires are extracted from a database and are established for the tire vulcanizers 1 thus specified. Further, it is judged whether the specification (e.g. tire width and groove shape) of the mold 11 attached to each of the specified tire vulcanizers 1 is in conformity with the type of the green tire 3 to be treated, and if the answer is affirmative, the loaded state of the mold 11 is maintained. On the other hand, if the specification of the mold 11 is not in conformity with the type of the green tire 3, it is decided that the tire vulcanizer 1 concerned requires replacement of the mold 11, and a mold replacement command is issued to this tire vulcanizer and also to the wheeled crane unit 30 on the mold conveying line 8 which is positioned on the rear side of the tire vulcanizer 1.

As shown in FIG. 2, the tire vulcanizer 1 which has received the replacement command causes the upper platen mechanism 13a and the lower platen mechanism 13b to relieve their holding force for the upper mold 11a and the lower mold 11b and causes the upper platen mechanism 13a to rise, whereby the mold 11 which comprises the upper and lower molds 11a, 11b is made removable.

On the other hand, the wheeled crane unit 30 which has received the replacement command first makes sure that it is empty with no mold 11 carried thereon and then travels toward the tire vulcanizer 1 which requires the mold replacement. Upon arrival at the rear side of the said tire vulcanizer, the wheeled crane unit 30 stops and causes the carriage 35 to assume a vertical position for replacement of the mold 11. Then, as shown in FIG. 4, the fork 35a of the carriage 35 is moved to the underside of the mold 11, allowing the mold to be rested on the fork 35a, and thereafter the fork is retreated, whereby the mold 11 is moved horizontally toward the carriage 35.

When the transfer of the mold 11 onto the carriage 35 is completed, as shown in FIG. 5, the wheeled crane unit 30 travels toward the mold storage shed 40 and transfers the mold 11 to a predetermined place in the mold storage shed. If the mold storage shed 40 is not present in the traveling direction of the wheeled crane unit (in the direction where the rails 28 and 29 are laid), the mold 11 is re-loaded onto another wheeled crane unit 30 which can travel into the mold storage shed 40 through the mold carrier 41, thereby allowing the mold to be transferred to a predetermined place in the mold storage shed.

Next, the wheeled crane unit 30 takes out a mold 11 of the specification conforming to the type of the green tire 3 from the mold storage shed 40 or from the preheating station 42, then conveys the mold 11 to the tire vulcanizer 1 which requires mold replacement and installs the mold therein by operations reverse to the above conveying operations from the tire vulcanizer 1 to the mold storage shed 40. Then, as shown in FIG. 2, the tire vulcanizer 1 thus loaded with the mold 11 causes the upper platen mechanism 13a to move down, allowing the upper platen mechanism to hold the upper mold 11a and the lower platen mechanism 13b to hold the lower mold 11b.

When appropriate mold 11 and vulcanizing conditions are thus established for all of the tire vulcanizers 1, the centralized monitor unit 45 outputs a vulcanization preparation end command to a controller (not shown) in the green tire conveying line 7, as shown in FIG. 5. The controller then commands the green tire conveying device 20 to convey the green tire 3 to the temporary stay portion 44 located on the input side of the station group 46 concerned. In accordance with this command the green tire conveying device 20 conveys a green tire 3 from the molding process or from the green tire stock yard 39 to the temporary stay portion 44 while carrying the tire in a suspended state.

As shown in FIG. 1, the green tire conveying device 20 stops traveling at a position above the temporary stay portion 44 and causes the green tire 3 to go down onto the table 44a of the temporary stay portion 44, whereupon the ID reader 44b of the temporary stay portion 44 reads production data such as type and lot number from the ID member of the green tire 3 and transmits the read data to the centralized monitor unit 45. On the basis of the production data the centralized monitor unit 45 judges whether the green tire 3 conforms to the production plan or not, and if the answer is negative, the centralized monitor unit 45 displays on the display screen of the monitor to the effect that there occurred a "conveyance error" and thereby informs the operator to that effect. At the same time, the centralized monitor unit 45 causes the green tire conveying device 20 to recover the green tire 3 and convey it to the green tire stock yard 39 shown in FIG. 5.

On the other hand, if the green tire 3 is in conformity with the production plan, the centralized monitor unit 45 outputs a conformity command to the temporary stay portion 44, which in turn detects the phase of the green tire 3 on the basis of the read position of the production data by the ID reader 44b for example and judges whether the present phase equals an insertion angle to the mold 11 corresponding to the production data. If the answer is affirmative, the temporary stay portion 44 waits for a green tire feed command from the associated vulcanizing station 37 while maintaining the present phase. On the other hand, if the present phase of the green tire 3 is not equal to the insertion angle, phasing of the green tire 3 is performed by turning the table 44a and thereafter the temporary stay portion 44 waits for a green tire feed command from the centralized monitor unit 45.

In each vulcanizing station 37, each tire vulcanizer 1 vulcanizes and molds the green tire 3 under vulcanizing conditions conforming to the production data. In the case where the operator 23 visually performs such an operation as finely adjusting the vulcanizing conditions for a specific tire vulcanizer 1, as shown in FIG. 2, the control panel 31 provided in the working passage 27 is operated, whereby the operation is controlled separately from the control made by the centralized monitor unit 45 shown in FIG. 1. When the vulcanizing and molding of the green tire 3 is complete, the upper mold 11a is raised to open the mold 11 and the vulcanized tire 4 placed on the lower mold 11b is held and taken out by the discharge loader 26. Then, the vulcanized tire 4 is moved to a position above the delivery conveyor 22 by turning the discharge loader 26 to the intermediate discharge position D. Thereafter, the discharge loader 26 is brought down and the vulcanized tire 4 is put on the delivery conveyor 22. The discharge loader 26 is then moved away from the vulcanized tire 4 and subsequently an end portion of the delivery conveyor 22 is turned upward, with the result that the vulcanized tire 4 moves toward the central position O under a gravitational action and is thereby transferred onto the conveyor 21. Now, the vulcanized tire 4 is conveyed to the inspection process by the conveyor 21, as shown in FIG. 1.

Next, upon discharge of the vulcanized tire 4 from the associated tire vulcanizer 1, the tire vulcanizer outputs a vulcanizing/molding end signal to the centralized monitor unit 45, which in turn causes the monitor to display the manufacturing condition on the display screen on the basis of the vulcanizing/molding end signal and thereby informs the operator of the manufacturing condition. Further, the centralized monitor unit 45 checks whether the type of the green tire 3 resting temporarily on the temporary stay portion 44 conforms to the vulcanizing/molding conditions established for the tire vulcanizer 1 which has outputted the vulcanizing/molding end signal, and if the answer is affirmative, the centralized monitor unit 45 outputs a green tire feed command to the green tire conveying device 20 in the green tire conveying line 7.

The green tire conveying device 20 which has received the green tire feed command holds and raises the green tire 3 from the temporary stay portion 44. Then, with the temporary stay portion 44 as a reference position of traveling start, the green tire conveying device 20 determines a traveling distance up to the tire vulcanizer 1 (feed system 5) to which the green tire is to be fed and travels by the distance thus determined, thereby allowing the green tire 3 to be positioned above the feed system 5. Thereafter, the green tire 3 is brought down onto the tire carrying table 16 in the feed system 5, as shown in FIG. 2.

Next, the green tire 3 is moved to an end portion (intermediate feed position C) of a horizontal support base 15 by moving the tire carrying table 16 toward the said end portion of the horizontal support base 15. Upon arrival at the intermediate feed position C, the green tire 3 is held and turned toward the vulcanizing/molding unit 9 by means of the feed loader 25, and is fed into the mold 11 which is in an open state. After the mold 11 is clamped, the green tire 3 is vulcanized and molded under predetermined vulcanizing and molding conditions and the resulting vulcanized tire 4 is discharged, followed by operation for the feed of a new green tire 3.

Thus, as shown in FIG. 1, the tire vulcanizer 1 according to this embodiment comprises the vulcanizing/molding unit 9 which is provided with the mold 11 removably and which vulcanizes and molds the green tire 3 into the vulcanized tire 4 within the mold 11, the feed system 5 which feeds the green tire 3 to the vulcanizing/molding unit 9, and the discharge system 6 which discharges the vulcanized tire 4 from the vulcanizing/molding unit 9, the feed system 5 and the discharge system 6 being disposed on the front side (one side) of the tire vulcanizer 1. But, regarding on which side the feed and discharge systems 5, 6 are to be disposed, no limitation is made to the front side insofar as both systems are disposed on one of the front and rear sides of the tire vulcanizer 1.

Figure 6A:
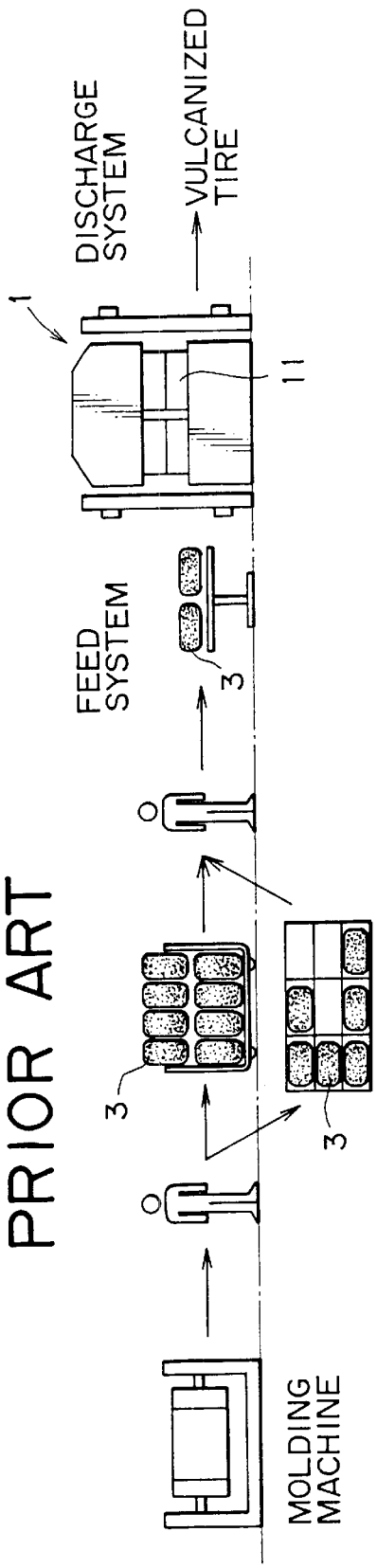
Figure 6B:
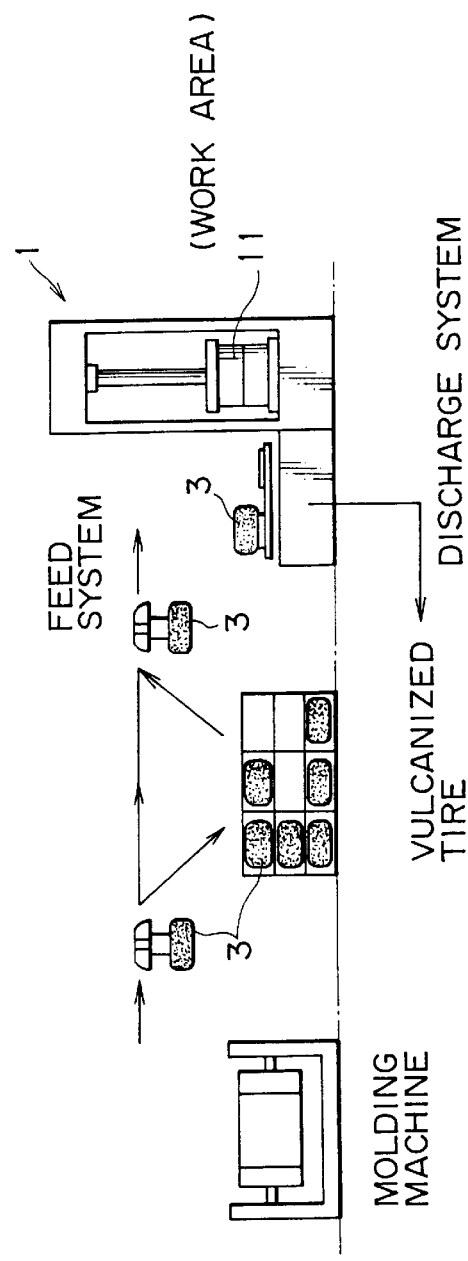

According to the above construction, as shown in FIG. 6B, since the feed system 5 and the discharge system 6 are disposed on one side of the tire vulcanizer 1, the other side of the tire vulcanizer can be used as an area for the mold replacement work in the vulcanizing/molding unit 9. In the prior art, since the feed and discharge systems 5, 6 are disposed on the front and rear sides, respectively, of the tire vulcanizer 1, as shown in FIG. 6A, it is necessary, for example, to remove devices of the feed system located on the front side to create a work area and restore the devices to their original states after the end of the work. In contrast therewith, the construction of this embodiment does not require such operations, that is, the replacement of the mold 11 can be completed in a short time, resulting in that the productivity can be improved.

In the tire vulcanizer 1 described above, as shown in FIG. 1, the feed system 5 and the discharge system 6 are disposed vertically in two stages when seen in the horizontal direction and at positions not overlapping each other in the transverse direction when seen from above.

According to this construction, the feed and discharge systems 5, 6 are completely separate from each other in both vertical and transverse directions, so that when a plurality of tire vulcanizers 1 are arranged in a parallel or opposed relation, a unificative handling can be done easily for the feed and discharge systems 5, 6 in those tire vulcanizers 1. More specifically, in the case where the green tire conveying line 7 and the vulcanized tire conveying line 38 are laid in common to all the feed systems 5 and discharge systems 6, it is possible to arrange the systems 5, 6 and the conveying lines 7, 8 in a predetermined positional relation to one another and hence possible to install the conveying lines 7 and 38 easily.

In the tire vulcanizer 1, the feed system 5 comprises the tire carrying table 16 which conveys the green tire 3 fed to the feed start position A up to the intermediate feed position C while carrying it thereon and the feed loader 25 which feeds the green tire 3 now in the intermediate feed position C to the vulcanizing/molding unit 9 while holding it. The discharge system 6 comprises the discharge loader 26 which discharges the vulcanized tire 4 from the vulcanizing/molding unit 9 to the intermediate discharge position D while holding it and the delivery conveyor 22 (delivery mechanism) which delivers the vulcanized tire 4 from the intermediate discharge position D to the post-process conveying position B. Thus, the feed system 5 and the discharge system 6 are realized by such simple constructions respectively.

Although in this embodiment the delivery conveyor 22 is used as the delivery mechanism, this constitutes no limitation. For example, the delivery conveyor 22 may be substituted by a delivery mechanism which is constructed so as to convey the vulcanized tire 4 while carrying it on a table such as the tire carrying table 16 in the feed system 5.

As shown in FIG. 1, the tire vulcanizing equipment according to this embodiment is provided with a vulcanizing lines 2 constituted by a plurality of tire vulcanizers 1 which are arranged side by side so that their one sides lie on the same side.

According to this construction, a work area for the replacement of mold 11 can be ensured along the opposite side of the vulcanizing line 2, so even when the mold 11 is to be replaced for many tire vulcanizers 1 included in the vulcanizing line 2, it is possible to effect the mold replacement in a continuous manner. Consequently, the mold replacing work can be completed in a short time not only for the tire vulcanizer 1 but also for all the tire vulcanizers 1 included in the vulcanizing line 2, whereby the productivity can be further improved.

In the tire vulcanizing equipment, as shown in FIG. 2, the green tire conveying line 7 which feeds the green tire 3 to the feed system 5 of each tire vulcanizer 1 in the vulcanizing line 2 and the vulcanized tire conveying line 38 which conveys the vulcanized tire 4 from the discharge system 6 in the vulcanizing line 2 to the post-process, are laid so as to vertically overlap each other with respect to the feed system 5 and the discharge system 6.

Although in this embodiment the green tire conveying line 7 and the vulcanized tire conveying line 38 are laid respectively above and below the feed system 5 and the discharge system 6, no limitation is made thereto. Both lines 7 and 38 may be deviated from the central position O or may be laid on the same upper or lower side with respect to the feed and discharge systems 5, 6.

According to the above construction, since the green tire conveying line 7 and the vulcanized tire conveying line 38 are laid overlapping each other in the vertical direction with respect to the feed and discharge systems 5, 6, both lines 7 and 38 are arranged in a three-dimensional manner relative to the feed and discharge systems 5, 6, so that the installation site of the tire vulcanizing equipment can be utilized more effectively than in a planar arrangement of both lines 5 and 38 relative to the feed and discharge systems 5, 6.

In the tire vulcanizing equipment, moreover, vulcanizing piping and/or a post-cure inflator are disposed below the feed and discharge systems 5, 6 of each tire vulcanizer 1 in the vulcanizing line 2, whereby the installation site of the tire vulcanizing equipment can be utilized more effectively.

Further, the tire vulcanizing equipment comprises a pair of vulcanizing lines 2, and by adopting a construction wherein the discharge systems 6 of the tire vulcanizers in one vulcanizing line 2 and the feed systems 5 of the tire vulcanizers in the other vulcanizing line 2 are vertically overlapped and opposed to each other, it is possible to dispose a pair of vulcanizing lines 2 in a small installation site.

In the tire vulcanizing equipment, moreover, the discharge systems 6 and the feed systems 5 of all the tire vulcanizers in the paired vulcanizing lines 2 are disposed overlapping each other along the vulcanizing lines 2, and the green tire conveying line 7 which conveys the green tire 3 to each of the feed systems 5 of the tire vulcanizers 1 in the paired vulcanizing lines 2 and the vulcanized tire conveying line 38 which conveys the vulcanized tire 4 from each of the discharge systems 6 of the tire vulcanizers 1 in the paired vulcanizing lines 2 to the post-process, are laid vertically overlapping each other with respect to the feed and discharge systems 5, 6.

Thus, the tire vulcanizing equipment comprises the vulcanizing lines 2 each having a plurality of tire vulcanizers 1 which are arranged so that one sides thereof lie one the same side. One sides of the paired vulcanizing lines 2 are opposed to each other so that the discharge systems 6 of the tire vulcanizers 1 in one vulcanizing line 2 and the feed systems 5 of the tire vulcanizers 1 in the other vulcanizing line 2 are opposed to each other. The green tire conveying line 7 for feeding the green tire 3 to the feed start position A of each feed system 5 in the paired vulcanizing lines 2 is disposed above the said position A, while the vulcanized tire conveying line 38 for conveying the vulcanized tire 4 to the post-process is disposed below the post-process conveying position B.

According to the above construction, since the green tire conveying line 7 and the vulcanized tire conveying line 38 are disposed vertically overlapping each other with respect to the feed and discharge systems 5, 6, it is possible to utilize the installation site of the tire vulcanizing equipment effectively. Besides, since the green tire conveying line 7 and the vulcanized tire conveying line 38, as one system, can be use in common to the paired vulcanizing lines 2, it is possible to reduce the equipment cost.

Further, as shown in FIG. 1, the tire vulcanizing equipment of this embodiment comprises tire vulcanizers 1, the tire vulcanizers 1 each comprising the vulcanizing/molding unit 9 which is provided with the mold 11 removably and which vulcanizes and molds the green tire 3 in the mold 11, the support frame 10 for supporting the vulcanizing/molding unit 9, the feed system 5 for feeding the green tire 3 to the vulcanizing/molding unit 9, and the discharge system 6 for discharging the vulcanized tire 4 from the vulcanizing/molding unit 9, the feed system 5 and the discharge system 6 being disposed on the front side (one side) of the tire vulcanizer 1; the green tire conveying line 7 which comprises the traveling rail 18 (rail for the green tire) disposed so as to vertically overlap the feed systems 5 of the tire vulcanizers 1 and the green tire conveying device 20 mounted on the traveling rail 18 so that it can travel on the rail to feed the green tire 3 to the feed systems 5 from above; and the rail support members 19 mounted on the support frames 10 of the tire vulcanizers 1 so support the traveling rail 18. In this case, the feed and discharge systems 5, 6 are disposed on one of the front and rear sides of the tire vulcanizers 1.

According to this construction, the replacement of the mold 11 can be completed in a short time, with consequent improvement of the productivity.

Further, as shown in FIG. 2, since the rail support members 19 for supporting the traveling rail 18 are mounted to the support frames of the tire vulcanizers 1, it is no longer necessary to use a complicated mechanism which causes the rail support members 19 to be supported by beams of a factory building for example. As a result, for the traveling rail 18, a sufficient rigidity can be attained with a reduced number of parts.

In addition to the above constructions, the tire vulcanizing equipment is further provided with the mold conveying line 8, the mold conveying line 8 comprising the upper and lower rails 28, 29 (rails for the mold) laid on the opposite side of the tire vulcanizers and the wheeled crane unit 30 which is mounted so as to be capable of traveling on both rails 28 and 29 and which can load and unload the mold 11 to and from the tire vulcanizers 1, the upper rail 28 being supported by the rails support members 19.

According to this construction, since the rail support members which support the traveling rail 18 and the upper rail 28 are mounted to the support frames 10, it is no longer required to use a complicated mechanism which causes the rail support members 19 to be supported by beams of a factory building for example. Consequently for both traveling rail 18 and upper rail 28 it is possible to attain a sufficiently high rigidity with use of a reduced number of parts.

Further, as shown in FIG. 1, the tire vulcanizing equipment of this embodiment comprises a vulcanizing line 2, the vulcanizing line 2 comprising a plurality of tire vulcanizers 1 arranged side by side so that one sides thereof lie on the same side, the tire vulcanizers 1 each comprising the vulcanizing/molding unit 9 which is provided with the mold 11 removably and which vulcanizes and molds the green tire 3 within the mold 11 into the vulcanized tire 4, the feed system 5 which feeds the green tire 3 to the vulcanizing and molding unit 9, and the discharge system 6 which discharges the vulcanized tire from the vulcanizing/molding unit 9, the feed system 5 and the discharge system 6 being disposed on one side (front side) of the tire vulcanizer 1; the green tire vulcanizing line 7 disposed on one sides of the vulcanizing lines 2 to feed the green tire 3 to each feed system 5; the vulcanized tire conveying line 38 disposed on one side of the vulcanizing line 2 to convey the vulcanized tire 4 from each discharge system 6 to the post-process (inspection process); and the mold conveying line 8 disposed on the opposite side of the vulcanizing line 2 to replace the mold 11 for each of tire vulcanizers 1 in the vulcanizing line 2. The feed and discharge systems 5, 6 may be disposed on one of the front and rear sides of the tire vulcanizers 1.

According to this construction it becomes possible to replace the mold 11 in a short time and hence possible to improve the productivity.

Further, as shown in FIG. 5, by disposing the mold conveying line 8 in the working area formed on the opposite sides of the tire vulcanizers 1, the replacement of the mold 11 can be done automatically without manual labor.

Further, the tire vulcanizing equipment comprises a vulcanizing station 37, the vulcanizing station 37 comprising two systems of the vulcanizing lines 2 disposed so that one sides thereof are opposed to each other, one system of the green tire conveying line 7 and the vulcanized tire conveying line 38 which are used in common to both vulcanizing lines 2. Thus, one system of the green tire conveying line 7 and vulcanized tire conveying line 38 can be used in common to two systems of vulcanizing lines 2, whereby it is possible to reduce the equipment cost.

The tire vulcanizing equipment has the green tire stock yard 39 which is provided between the molding process for molding the green tire 3 and the vulcanizing lines 2 and which stores the green tire 3 in such a manner that the green tire can be fed through the green tire conveying line 7. Thus, since the green tire 3 can be stored in the green tire stock yard 39, even when the production capacity is deteriorated temporarily due to the mold replacing work or repair work in any vulcanizing line 2, the green tire 3 can be produced continuously without making production adjustment in the molding process.

Further, the tire vulcanizing equipment has the mold storage shed 40 which stores the mold 11 in such a manner that the mold can be fed and discharged through the associated mold conveying line 8. According to this construction, for the vulcanizing lines 2 and the vulcanizing station 37, various molds 11 can be replaced and stored without manual labor.

As shown in FIG. 1, moreover, the tire vulcanizing equipment has the temporary stay portion 44 provided with the ID reader 44b which reads production data of the green tire 3 halfway during conveyance to the vulcanizing line 2 through the green tire conveying line 7 and also has the centralized monitor unit 45 which, on the basis of the production data provided from the temporary stay portion 44, judges whether the green tire 3 conforms to the production plan or not. According to this construction, even in the event the conveyed green tire 3 is not in conformity with the production plan, it is possible for the temporary stay portion 44 to detect it and take an appropriate countermeasure halfway during conveyance, whereby a decrease of yield vulcanizing and molding caused by a feed error can be prevented.

The temporary stay portion 44 has the table 44a which is adapted to turn while carrying the green tire 3 thereon so as to make phasing of the green tire 3 relative to the mold 11 on the basis of production data on the green tire 3. According to this construction, even when different types of green tires 3 are to be subjected vulcanizing and molding simultaneously, various type of vulcanized tires can be produced by phasing the green tires 3 on the basis of production data.

Figure 7:
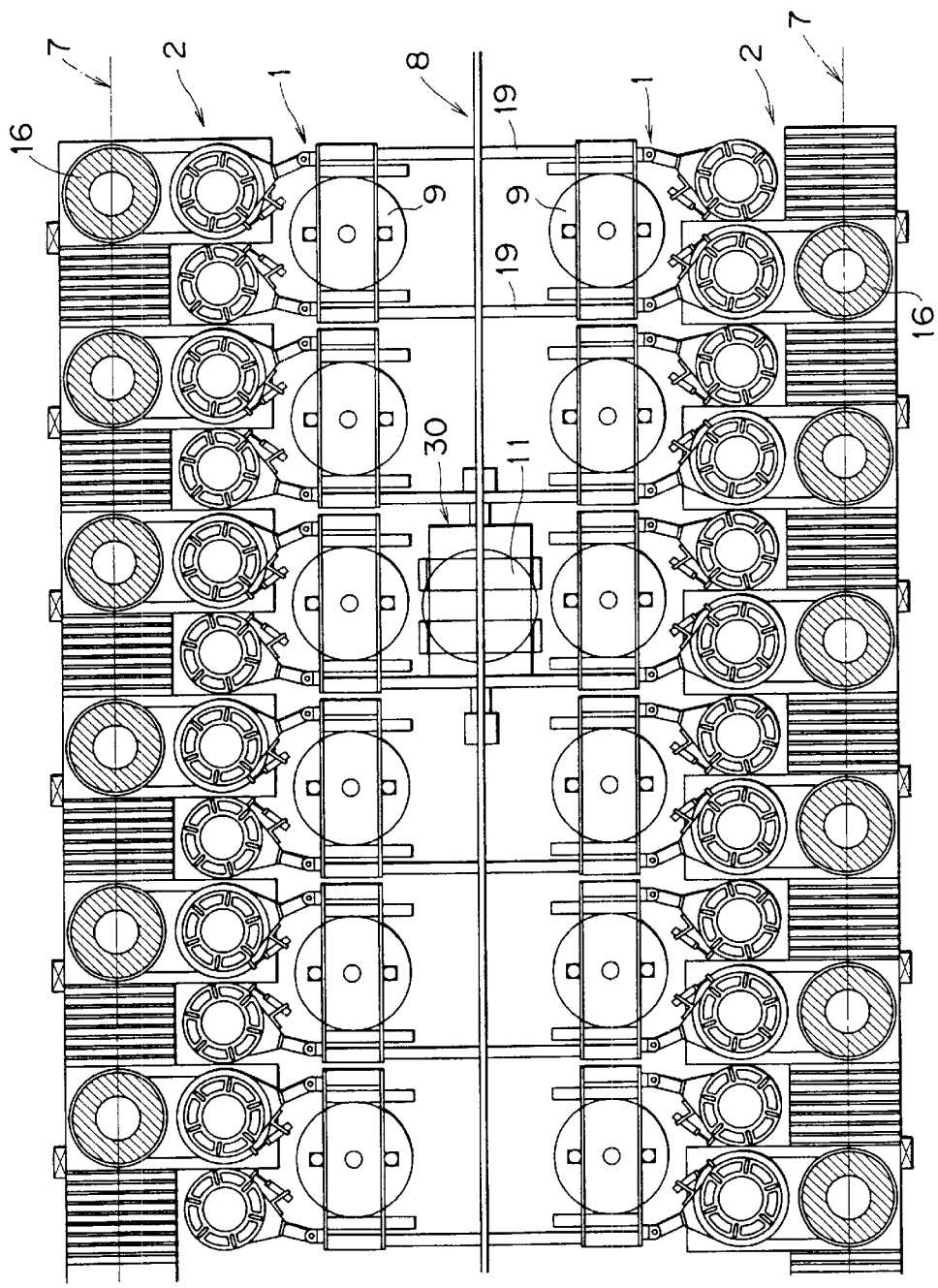
FIG. 7 is a plan view of a principal portion of the tire vulcanizing equipment.
Figure 8:
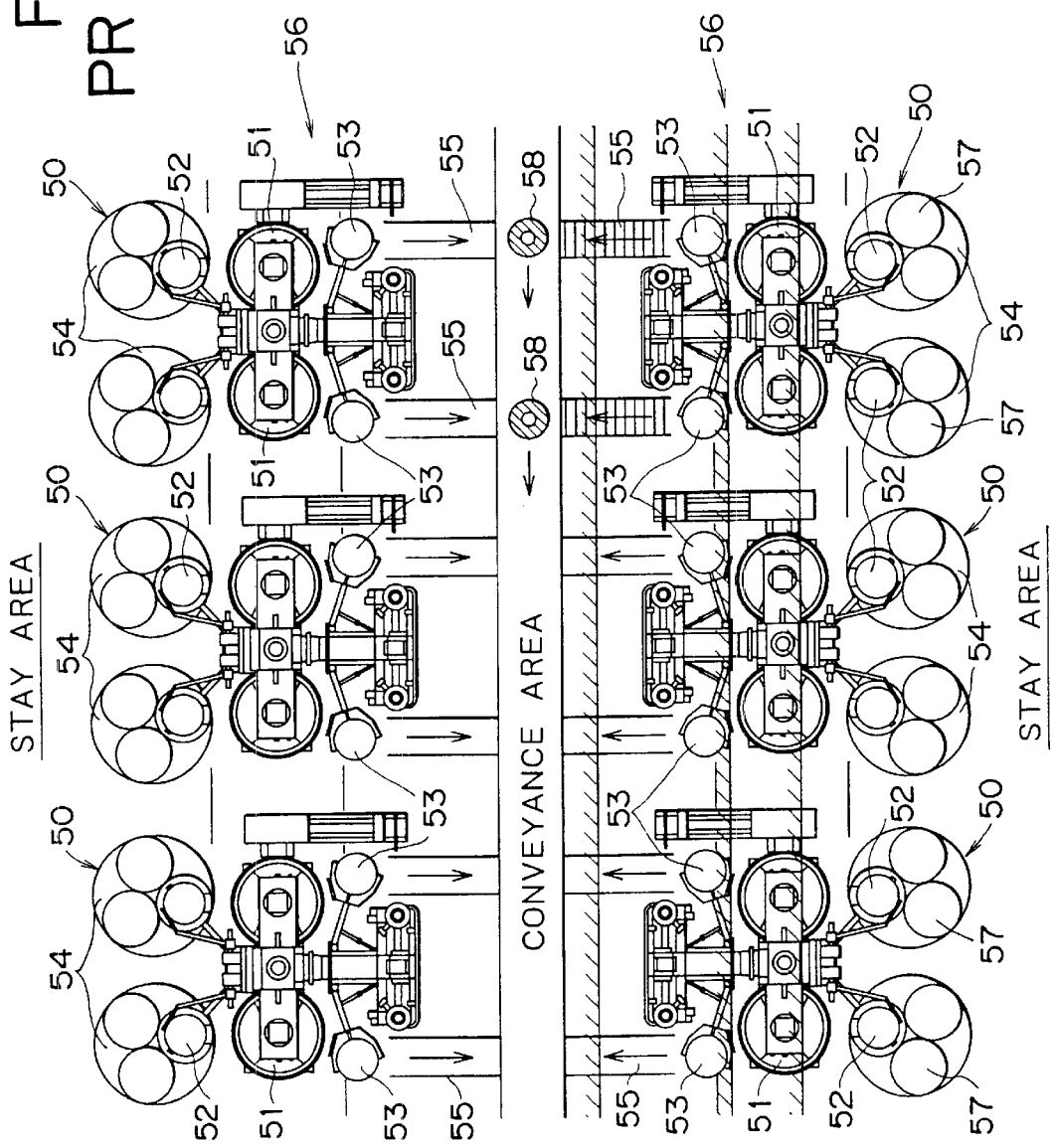
FIG. 8 is a plan view of a conventional tire vulcanizing equipment.

Although in this embodiment a pair of vulcanizing lines 2 are installed in an opposed relation to each other so that the respective one sides (front sides) where the feed and discharge systems 5, 6 are located are opposed to each other and the green tire conveying line 7 and the vulcanized tire conveying line 38 are laid between both vulcanizing lines 2 so as to be used in common by both vulcanizing lines, no limitation is made to this arrangement. For example, there may be adopted such a construction as shown in FIG. 7. That is, the tire vulcanizing equipment comprises a pair of vulcanizing lines 2 installed so that the respective opposite sides (rear sides) are opposed to each other and a mold conveying line 8 laid between both vulcanizing lines 2 to replace the mold 11 for each of the tire vulcanizers 1 included in both vulcanizing lines 2. In this case, one system of the mold conveying line 8 can be used in common by the paired vulcanizing lines 2, whereby the equipment cost can be reduced.

I claim:

1. A tire vulcanizing equipment comprising:
   a tire vulcanizer comprising:
      a vulcanizing/molding unit which is provided with a removable mold and which vulcanizes and molds a green tire within said mold into a vulcanized tire;
      a feed system for feeding the green tire to said vulcanizing/molding unit; and
      a discharge system for discharging the vulcanized tire from said vulcanizing/molding unit,
      said feed system and said discharge system being disposed on a first side of the tire vulcanizer;
   a green tire conveying line comprising a traveling rail laid so as to vertically overlap the feed system of the tire vulcanizer and a green tire conveying device which is disposed so as to be capable of traveling on said traveling rail and which feeds the green tire to said feed system from above;
   a mold conveying line comprising a mold rail disposed on an opposite side from the first side of the tire vulcanizer and a wheeled crane unit which is disposed so as to be capable of traveling on said mold rail and which can load and unload the mold to and from the tire vulcanizer; and
   a rail support member for supporting said green tire rail and said mold rail, said rail support member being mounted to a support frame of the tire vulcanizer,
   wherein a plurality of said tire vulcanizers are disposed so that respective opposite sides are opposed to each other, and said mold conveying line is laid between said tire vulcanizers.

2. A tire vulcanizing equipment according to claim 1, further comprising:
   a support frame for supporting said vulcanizing/molding unit.

3. A tire vulcanizing equipment according to claim 1, wherein:
   said feed system and said discharge system are disposed in parallel when seen in the horizontal direction and so as not to overlap each other when seen from above.

4. A tire vulcanizing equipment according to claim 3, wherein:

said feed system comprises a tire carrying table which conveys the green tire fed to a feed start position up to an intermediate feed position while carrying it thereon and a feed loader which holds and conveys the green tire thus conveyed to said intermediate feed position up to said vulcanizing/molding unit; and said discharge system comprises a discharge loader which holds and conveys the vulcanized tire from said vulcanizing/molding unit up to an intermediate discharge position and a delivery mechanism which delivers the vulcanized tire thus conveyed to said intermediate discharge position up to a post-process conveying position.

5. A tire vulcanizing equipment according to claim 1, further comprising:

a vulcanized tire conveying line which is disposed on a first side of said tire vulcanizer and which conveys the vulcanized tire from the discharge system of each said tire vulcanizer to a post-process.

6. A tire vulcanizing equipment according to claim 5, further comprising:

a mold storage shed which stores the mold so that the mold can be fed through said mold conveying line.

7. A tire vulcanizing equipment according to claim 1, further comprising:

a support frame for supporting said vulcanizing/molding unit.

8. A tire vulcanizing equipment comprising:

a vulcanizing line comprising a plurality of tire vulcanizers, the tire vulcanizers each comprise:

a vulcanizing/molding unit which is provided with a removable mold and which vulcanizes and molds a green tire within said mold into a vulcanized tire;

a feed system for feeding the green tire to said vulcanizing/molding unit; and a discharge system for discharging the vulcanized tire from said vulcanizing/molding unit, said feed system and said discharge system being disposed on a first side of the tire vulcanizer, and said plurality of tire vulcanizers being arranged so that respective first sides lie on a same side;

a green tire conveying line which is laid on a first side of said vulcanizing line and which feeds the green tire to the feed system of each of said tire vulcanizer;

a vulcanized tire conveying line which conveys the vulcanized tire from the discharge system of each said tire vulcanizer to a post-process;

a mold conveying line which is disposed on an opposite side from the first side of said vulcanizing line and which replaces the mold for each of said tire vulcanizers in said vulcanizing line; and a vulcanizing station, said vulcanizing station comprising two systems of said vulcanizing lines which are laid so that opposite sides from respective first sides are opposed to each other and one system of said mold conveying line used in common by both said vulcanizing lines.

9. A tire vulcanizing equipment according to claim 8, further comprising:

a green tire stock yard disposed between a green tire molding process for molding said green tire and said vulcanizing line, said green tire so that the green tire can be fed through said green tire conveying line.

10. A tire vulcanizing equipment according to claim 8, further comprising:

a temporary stay portion having an ID reader which reads production data of the green tire while the green tire is conveyed in the vulcanizing line by said green tire conveying line; and a centralized monitor unit which, on the basis of the production data provided from said temporary stay portion, judges whether the green tire conforms to a production plan.

11. A tire vulcaninzing equipment according to claim 10, wherein:

said temporary stay portion has a table which is adapted to turn while carrying the green tire thereon so as to phase the green tire with respect to the mold on the basis of the green tire production data.

* * * * *